United States Patent [19]

Scriven et al.

[11] 4,098,743

[45] Jul. 4, 1978

[54] POLYLACTONE-POLYURETHANES AND AQUEOUS DISPERSIONS THEREOF

[75] Inventors: Roger L. Scriven; Wen-Hsuan Chang, both of Gibsonia, Pa.

[73] Assignee: PPG Industries, Inc., Pittsburgh, Pa.

[21] Appl. No.: 690,338

[22] Filed: May 26, 1976

[51] Int. Cl.$^2$ .................. C08G 18/42; C08G 63/08; C08K 3/02
[52] U.S. Cl. .................. 260/29.2 TN; 260/22 TN; 260/29.4 R; 260/29.2 N; 260/30.2; 260/32.8 N; 260/830 P; 260/849; 260/858; 528/80; 528/354
[58] Field of Search .................. 260/29.2 R, 29.2 TN, 260/78.3 R, 77.5 AN, 849, 29.2 N

[56] References Cited

U.S. PATENT DOCUMENTS

| | | | |
|---|---|---|---|
| 2,890,208 | 6/1959 | Young et al. | 260/78.3 R |
| 3,169,945 | 2/1965 | Hostettler et al. | 260/78.3 R |
| 3,412,054 | 11/1968 | Milligan et al. | 260/18 PT |
| 3,640,924 | 2/1972 | Hermann et al. | 260/77.5 AM |
| 3,658,939 | 4/1972 | Carpenter et al. | 260/75 NH |
| 3,736,216 | 5/1973 | Hermann et al. | 260/29.2 TN |
| 3,835,081 | 9/1974 | Remley | 260/77.5 AM |
| 3,923,713 | 12/1975 | Hermann | 260/77.5 AM |
| 3,983,058 | 9/1976 | Hirooka et al. | 260/77.5 AM |
| 4,046,729 | 9/1977 | Scriven et al. | 260/29.2 TN |

FOREIGN PATENT DOCUMENTS

| | | | |
|---|---|---|---|
| 7,235,077 | 4/1972 | Japan | 260/78.3 R |

*Primary Examiner*—H.S. Cockeram
*Attorney, Agent, or Firm*—William J. Uhl

[57] ABSTRACT

Water-soluble polylactones and poly(lactone-urethanes) are disclosed. The polylactones are prepared by ring opening a lactone such as epsilon-caprolactone with a low equivalent weight active hydrogen-containing material having at least two active hydrogen groups per molecule selected from the class consisting of hydroxyl, primary amine, secondary amine and thiol, and having anionic water-solubilizing groups or groups which are readily reacted to form anionic water-solubilizing groups. The resulting polylactone can be combined with curatives such as amine-aldehyde condensates to form water-soluble coating compositions and can be reacted with polyisocyanates to form unique water-soluble poly(lactone-urethanes, ureas or thiolurethanes) which are also useful for coating applications.

Surprisingly, it has been found that the polyurethanes prepared by reacting organic polyisocyanates with the novel polylactone adducts of the present invention and optionally low molecular weight diols are more water dispersible and form coatings with greater adhesion to the substrate and less water sensitivity than comparable polyurethanes prepared by reacting organic polyisocyanates with conventional polylactone diols and low equivalent weight active hydrogen-containing materials which also have anionic water-solubilizing groups.

20 Claims, No Drawings

POLYLACTONE-POLYURETHANES AND AQUEOUS DISPERSIONS THEREOF

BACKGROUND OF THE INVENTION

Field of the Invention: This invention relates to water-soluble polylactones and water-soluble reaction products of polylactones with organic polyisocyanates. In another aspect, this invention relates to coating compositions prepared from such water-soluble materials.

Brief Description of the Prior Art: U.S. Pat. No. 3,169,945 to Hostettler et al discloses polylactones which are formed from ring opening a lactone such as epsilon-caprolactone with an active hydrogen-containing material. Examples of suitable active hydrogen-containing materials are polyols,, amino alcohols, monohydroxy carboxylic acids and monoamino carboxylic acids, as well as polyester polyols. The polylactones are reacted with polyisocyanates to form highly crosslinked polyurethanes which have the consistency of millible gums. These products are principally of interest as rubber substitutes.

Japanese Pat. No. 72.35077 discloses polymerizing epsilon-caprolactone with compounds of the formula

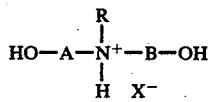

where R is alkyl, cycloalkyl or aryl, A and B are the same or different divalent aliphatic radicals and HX is hydrochloric, sulphuric, nitric or phosphoric. The polylactone can be used as an intermediate or polyurethane formation.

It is well known in the art that polylactones, such as those prepared from ring opening epsilon-caprolactone with polyols such as ethylene glycol and trimethylolpropane, can be co-reacted with polyol-containing carboxylic acids, such as dimethylolpropionic acid and organic polyisocyanates. The unreacted carboxylic acid groups can be neutralized to make the polymer water dispersible and useful in aqueous coating compositions.

Unfortunately, there are certain disadvantages in preparing polyurethane with polyol-containing carboxylic acids such as dimethylolpropionic acid. These polyols, in addition to other polyols normally used, require more organic polyisocyanate to react with the polyol-carboxylic acid. In forming light stable compositions requiring aliphatic or cycloaliphatic diisocyanates, this can become prohibitively expensive. In addition, dimethylolpropionic acid and similar materials are crystalline and have a low rate of dissolution making formulation difficult.

According to the present invention, a polyol-containing carboxylic acid such as dimethylolpropionic acid is pre-reacted with a lactone such as epsilon-caprolactone to form a polylactone polyol containing free carboxylic acid groups. The polylactone can then be reacted with organic polyisocyanates to form polyurethanes containing free carboxylic acid groups which can be neutralized and dispersed in aqueous medium. The present invention overcomes many of the disadvantages of the prior art in that it is easier to use less polyisocyanate to get the same relative amount of carboxylic acid group into the polymer. By pre-reacting the dimethylolpropionic acid with epsilon-caprolactone, a non-crystalline adduct is produced making polyurethane formulation easier than with crystalline dimethylolpropionic acid.

As mentioned above, it has also been found that polyurethanes prepared by reacting organic polyisocyanates with the adduct of dimethylolpropionic acid and epsilon-caprolactone are more water dispersible and deposit as coatings with greater adhesion to the substrate and less water sensitivity than comparable polyurethanes prepared by reacting organic polyisocyanates with dimethylolpropionic acid and conventional polylactone diols by a one-shot technique.

SUMMARY OF THE INVENTION

In accordance with the present invention, a lactone of the formula:

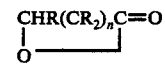

wherein $n$ is an integer of from 4 to 6, and wherein at least $(n+2)$ R's are hydrogen and wherein the remaining R's are of the group consisting of hydrogen, alkyl, cycloalkyl, alkoxy and single ring aromatic hydrocarbon radicals, is reacted with an active hydrogen-containing material having at least two active hydrogen groups per molecule selected from the class consisting of hydroxyl, primary amine, secondary amine and thiol. The active hydrogen-containing ring opener used in the present invention has anionic water-solubilizing groups or groups which are readily reacted to form anionic water-solubilizing groups. Examples of such groups would be carboxylic acid groups and salts of such carboxylic acid groups. The active hydrogen-containing material is further characterized as having an ionic equivalent weight of less than 1000, preferably within the range of 25 to 500, and more preferably within the range of 50 to 250; the ionic equivalent weight being based on the anionic water-solubilizing groups or groups which are readily reacted to form the anionic water-solubilizing groups.

The invention also provides for combinations of the aforementioned polylactones with other resins such as alkyds or acrylics or with crosslinkers such as amine-aldehyde condensates and for aqueous dispersions of said polylactones either alone or in combination with other resins or crosslinkers.

In another embodiment, the invention provides for ungelled polyurethanes comprising the reaction product of an organic polyisocyanate and the polylactone prepared as described above.

The invention also provides for combinations of the aforementioned polyurethanes with crosslinkers such as amine-aldehyde condensates and for aqueous, as well as organic solvent, dispersions and solutions of such polyurethanes either alone or with additional crosslinker.

The invention also provides for coating compositions employing the aforementioned polyurethanes with and without crosslinkers, in combination with pigment.

DETAILED DESCRIPTION

As has been mentioned above, the active hydrogen-containing polylactones are formed by polymerizing lactones in the presence of a specified active hydrogen-containing material which also contains anionic water-solubilizing groups or groups which are readily reacted to form anionic water-solubilizing groups.

The polylactones which are obtained from the above reaction are characterized by the presence of terminal active hydrogens selected from the class consisting of hydroxyl, primary and secondary amino and thiol, and recurring

moieties wherein n is at least 4, preferably from 4 to 6 and at least (n+2) R's are hydrogen and the remaining R substituents are selected from the group consisting of hydrogen, alkyl, cycloalkyl and alkoxy, none of the containing contaning more than 12 carbon atoms, the total number of carbon atoms in the substituents in the lactone ring not exceeding 12. The polylactones have active hydrogen numbers within the range of 10 to 500, preferably 15 to 300, as determined by ASTM E-222-67, Method B, corrected for acid value.

The polymerization of the lactone and the active hydrogen-containing material is conducted at a temperature of at least 15° C., preferably between 25° and 200° C., and optionally in the presence of an ester interchange catalyst such as tetraisopropyl titanate, stannous octoate or para-toluene sulfonic acid. Catalyst concentrations of between 0.001 to 0.5 percent by weight based on weight of starting material are suitable. In order to avoid reaction with the water-solubilizing groups, excessive levels of catalyst and high temperatures are avoided.

The equivalent ratio of lactone to active hydrogen-containing material is at least 0.5:1 and usually within the range of 0.8 to 20:1, and reaction conducted at low temperatures in the presence of catalyst to encourage reaction through the active hydrogens, i.e., hydroxyl, thiol, primary amines and secondary amines. When primary and secondary amines are used, a stronger base may be present to prevent zwitterion formation.

The lactone used as the starting material may be any lactone, or combination of lactones, having at least 6 carbon atoms, for example, from 6 to 8 caarbon atoms in the ring. The lactone used as the starting material can be represented by the following general formula:

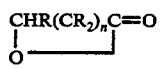

wherein n and R have the meanings referred to above.

The lactones preferred in the practice of the invention are the epsilon-caprolactones in which n equals 4 in the above structure. Most preferred is unsubstituted epsilon-caprolactone, in which n is equal to 4 and all of the R's in the above structure are hydrogen. Epsilon-caprolactone is preferred because it is readily available in commercial quantities and gives the best coating properties.

The active hydrogen-containing ring opener has an ionic equivalent weight of less than 1000; the ionic equivalent weight being determined in relation to the anionic water-solubilizing groups and has at least two groups selected from the class consisting of hydroxyl, primary amine, secondary amine and thiol. The anionic water-solubilizing groups can be selected from the folowng class:

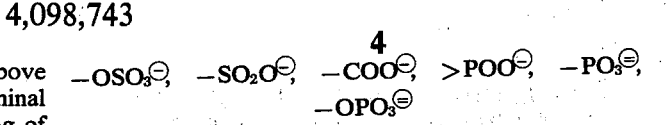

with —COO⊖ being preferred.

Preferred organic functional initiators are those having the following structural formula:

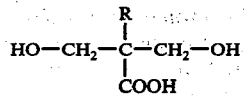

wherein R is hydrogen or an alkyl group containing from 1 to 12 carbon atoms or is $CH_2OH$. Examples include dimethylolpropionic acid, dimethylolbutyric acid, dimethylolvaleric acid and trimethylolacetic acid. Most preferred is dimethylolpropionic acid.

Examples of other organic functional initiators include glyceric acid, 9,10-dihydroxystearic acid, tartaric acid, dihydroxybenzoic acid, 2-hydroxymethyl-3-hydroxypropanesulfonic acid, dihydroxybenzenesulfonic acid, lysine, diaminobenzenesulfonic acid, and polyester diols having the required ionic equivalent weight.

To form the polyurethane products, the polylactones described above are reacted with an organic polyisocyanate. It should be pointed out at this point in the specification that where the term "polyurethane" is used in the specification and claims, it is intended to cover not only the polycondensates of polyisocyanates and polylactone polyols, but also the condensates of polyisocyanates and polylactones having active hydrogens selected from the group consisting of not only hydroxyl but also primary and secondary amine and thiol. Thus, the term "polyurethane" is defined as any polymer containing two or more urethane groups and is also intended to cover polyureas and polythiolurethanes.

The organic polyisocyanate which is used reacts with the polylactone and can be an aliphatic or an aromatic polyisocyanate or mixture of the two. Aliphatic polyisocyanates are preferred since it has been found that these provide better color stability in the resultant coating. Also, diisocyanates are preferred, although higher polyisocyanates can be used usually in combination with monoisocyanates. Examples of suitable higher polyisocyanates are 1,2,4-benzene triisocyanate and polymethylene polyphenyl isocyanate. Examples of suitable monoisocyanates are cyclohexyl isocyanate and toluene isocyanate. Examples of suitable aromatic diisocyanates are: 4,4'-diphenylmethane diisocyanate and tolylene diisocyanate. Examples of suitable aliphatic diisocyanates are straight chain aliphatic diisocyanates such as 1,4-tetramethylene diisocyanate and 1,6-hexamethylene diisocyanate, and cycloaliphatic diisocyanates such as isophorone diisocyanate and 4,4'-methylene-bis(cyclohexyl isocyanate). This particular diisocyanate is preferred and is commercially availabe from E. I. duPont de Nemours and Company under the trademark HYLENE W ®.

In reacting the polyisocyanates with the polylactones, other active hydrogen-containing materials can optionally be co-reacted to modify the properties of the resultant polyurethane. The term "active hydrogen" means compounds or polymers containing hydrogens associated with hydroxyl, primary and seconary amine and thiol groups. Examples of such active hydrogen-containing materials can be found on page 13, line 7, to page 21, line 3, of our copending application, U.S. Ser.

No. 582,946, filed on June 2, 1975, assigned to PPG Industries, Inc., the assignee of the present invention, the portions of which are hereby incorporated by reference.

The conditions of reaction between the polylactones, polyisocyanate and other optional active hydrogen-containing materials are chosen so as to produce an ungelled urethane reaction product which may contain active hydrogens.

The polylactones of the present invention can be prepared with an organic functional initiator containing the anionic water-solubilizing groups, i.e., acid salt groups, or as is more normally the case, can be prepared with the acid-containing organic functional initiator which can be subsequently neutralized after polylactone or polyurethane formation. Suitable neutralizing agents or salt-forming agents include inorganic and organic bases such as sodium hydroxide, potassium hydroxide, amines such as ammonia, primary, secondary and tertiary amines. When the neutralizing amine is reactive, it should be used under conditions where it will not cause interfering side reactions. For example, it should be added after lactone polymerization and/or reaction with isocyanate.

The amount of anionic water-solubilizing groups contained in the polymer depend on the type of product desired, the molecular weight of the product, as well as the presence of any hydrophilic or hydrophobic groups in the polylactone or polyurethane molecule.

The amount of anionic water-solubilizing groups in the polylactone can be expressed as the ionic equivalent weight which is defined as the weight per ionic group and which can be determined by dividing the weight of the polylactone in grams by the number of anionic water-solubilizing groups (or groups which are capable of forming anionic water-solubilizing groups) present in the polylactone. The ionic equivalent weight of the polylactone should be 4000 or less, preferably in the range of 200 to 3000 in order to form stable dispersions. Much higher ionic equivalent weights than that specified in the above-mentioned preferred range are also not recommended because the resultant polylactone and polyurethane will have poor water dilutability. Such prepolymers form coarse, sedimenting dispersions which cannot easily be used to form stable, smooth, uniform coating compositions.

To form a finely divided, stable dispersion, the polylactone or polyurethane should be within a viscosity range of 10 to 10,000, preferably from about 20 to 5000 centipoises under conditions of dispersion. With some polymers, solvent may have to be added to fall within this viscosity range. Some polylactones tend to be crystalline at room temperature. These must be melted or dissolved in a suitable solvent before dispersing. In some cases, the tendency to crystallize is observed even after dispersion in that the dispersion forms a solid or semi-solid mass upon standing at room temperature. However, when these dispersions are heated (even without agitation), the dispersions return to their original form. Practically, this means that dispersions that tend to crystallize may need to be heated before they are used. Polymers within this viscosity range are easy to disperse, requiring only mild agitation. Polymers with viscosities higher than 10,000 centipoises are difficult to disperse even with high shear agitation equipment because large or very coarse dispersions are formed which are usually sedimenting.

The amount of aqueous medium employed in the formulations of the solutions of the present invention is fairly important. When too little amount of aqueous medium is employed, compositions are obtained which are often too thick to handle easily while, on the other hand, solutions which are too dilute are uneconomical to handle due to their excessive volume. In general, the aqueous medium will be about 15 to 80 percent by weight, preferably about 20 to 70 percent by weight, based on total weight of the polymer and the aqueous medium. Water is a necessary ingredient of the aqueous medium, being present in an amount of at least 30, preferably at least 45 percent by weight, based on total weight of the aqueous medium with co-solvent constituting the remainder of the medium.

The term "solution" or "dispersion" as used within the context of the present invention is believed to be a translucent, aqueous polymer system in which the polylactone or polyurethane is either a dispersed or a continuous phase. In most instances, the polylactone or polyurethane is dispersed and when thinned with water to form a one percent solids dispersion, the average particle size diameter is less than 10 and preferably less than 5, most preferably one micron or less as determined by light transmission. The average particle size is determined by measuring the turbidity of a homogeneous aqueous dispersion and applying the Mie theory to this measurement. The particles may be spherical or elongated. Alternately, they may be invisible by microscopic investigation. The solutions or dispersions are generally only stable if the particle size is less than 5 microns and preferably is one micron or less. Small particle size solutions or dispersions are advantageous because they are non-sedimenting and have a high surface energy associated with them. This results in a strong driving force for coalescing and in coatings having surprisingly fast drying times. The term "solution" or "dispersion" is also intended to cover homogeneous aqueous compositions which appear optically clear.

Curing agents are often added to the dispersion, these agents bringing about chemical crosslinking after a film is deposited either at room temperature or elevated temperature, depending upon the coating system. Examples of suitable curing agents would be aminoplast resins, phenol-formaldehyde resins, formaldehyde, alkoxy silanes, organic polyisocyanates which include free as well as masked and blocked isocyanates, and epoxy-containing organic materials which are used when the polylactone or the polyurethane contains amino hydrogens. Water-soluble crosslinking agents such as the aminoplast, formaldehyde and phenolics are simply added to the finished dispersion, whereas the more hydrophobic materials such as the organic isocyanates and some epoxy-containing materials are preferably dissolved or emulsified in a solvent which is compatible with the water. The curing agents are those which are capable of reacting with the active hydrogens of the polylactone or polyurethane to form a crosslinked product.

The aminoplast, phenol-formaldehyde and isocyanate curing agents are employed to cure products containing free hydroxyl amine or amine-formaldehyde groups. Suitable aminoplast, phenolic and isocyanate curing agents are described in U.S. Patent application Ser. No. 392,585, now U.S. Pat. No. 3,919,351, to Chang et al., page 9, line 19, to page 11, line 11, which is hereby incorporated by reference.

Examples of other curing agents are organic epoxy materials. Epoxies can be used as curing agents to cure products containing free amino groups. Epoxy compounds can be any monomeric or polymeric compound or mixture of compounds having a 1,2-epoxy equivalency greater than 1, that is, in which the average number of 1,2-epoxy groups per molecule is greater than 1. Useful classes of polyepoxides are polyglycidyl ethers of polyphenols, such as Bisphenol A, or polyols such as butanediol.

The curing agents described above are examples of external curing agents which form one component of a two-component system with the polylactone or polyurethane forming the other component. These two-component systems come in the form of one or two-package systems depending on the reactivity of the curing agents at room temperature. For example, aminoplast curing agents which are usually unreactive at room temperature may be blended with a polyurethane dispersion of the invention to form stable one-package systems. On the other hand, some epoxy curing agents and all free NCO-type curing agents, because of their high reactivity at room temperature, must be used with the dispersions of the invention in a two-package system.

The amount of curing agent employed will depend primarily on the final properties desired in the cured polymer film. In general, at least about 1 percent and preferably from about 5 to 75 percent by weight of a curing agent or agents should be used, the percentage by weight being based on total weight of the polylactone or the polyurethane and the curing agent.

Curing conditions can vary widely depending primarily on the curing agent as well as the particular components of the composition. For heat curing, a catalyst can be used to permit cure at lower temperatures for shorter periods of time. In general, the cure schedule can be from as short as one minute to as long as several hours and from temperatures such as room temperature or 23° C. to elevated temperatures as high as 500° C.

In addition to the components mentioned above, aqueous dispersions employing the polylactones or the polyurethanes of the present invention ordinarily contain optional ingredients, including any of the various pigments ordinarily utilized in coatings. In addition, various fillers, plasticizers, anti-oxidants, flow control agents, surfactants, and other agents such as formulating additives can be employed.

The compositions herein can be applied by any conventional method, including brushing, dipping, flow coating, electrodepositon, electrostatic spraying, and the like, but they are most often applied by air spraying. The usual spray techniques and equipment are utilized. The coatings of the present invention can be applied over virtually any substrate, including wood, metals, glass, cloth, plastic, foam and the like, as well as over various primers. The compositions disclosed herein can be added to other water-compatible compositions to improve the flexibility, hardness, drying and other coating properties.

Besides aqueous dispersions and solutions, the products prepared by the processes of the invention can also be used neat and in the form of organic solvent-based solutions and dispersions. Suitable organic solvents are ketones such as methyl ethyl ketones and solvents such as N-methylpyrrolidone.

EXAMPLE I

To show the surprising degree of solubility and substrate adhesion obtained with the poly(lactone-urethanes) of the present invention, the following comparative test was conducted.

A polylactone diol was prepared in accordance with the invention. Epsilon-caprolactone was ring opened with dimethylolpropionic acid and this product was combined with neopentyl glycol and reacted with diisocyanate to form an NCO prepolymer. The polymer was neutralized, dispersed and chain extended in water to form an aqueous polyurethane dispersion. This product was then compared for dispersibility with a similar polyurethane product in which the polylactone diol was formed from ring opening epsilon-caprolactone with neopentyl glycol. This adduct was combined with dimethylolpropionic acid and reacted with diisocyanate to form an NCO prepolymer. The prepolymer was neutralized, dispersed and chain extended in water to form an aqueous polyurethane dispersion.

The poly(lactone-urethane) of the present invention was prepared from the following charge:

| Ingredient | Parts by Weight |
|---|---|
| polylactone diol of Example IV infra | 709.5 |
| neopentyl glycol | 59.5 |
| N-methylpyrrolidone (containing 0.05 percent by weight water) | 353.1 |
| deionized water | 0.89 |
| dibutyltin dilaurate | 0.6 |
| 4,4'-methylene-bis(cyclohexyl isocyanate) commercially available from E. I. duPont de Nemours & Co. as HYLENE W | 446.7 |

The above reactants (NCO/OH equivalent ratio of 1.44) were charged to a reaction vessel and reacted at about 95° C. under a nitrogen atmosphere for about 2½ hours to form an NCO prepolymer having an NCO equivalent of about 1500.

Four hundred (400) parts by weight of this prepolymer at a temperature of about 70° C. were then charged to a mixture of 7.7 parts by weight of N,N-dimethylethanolamine, 480 parts by weight of deionized water and 6.4 parts by weight of hydrazine hydrate solution (64 percent by weight minimum) chain extender at a temperature of about 70°–75° C. to form a yellowish, translucent dispersion, which appeared thick and moderately cloudy. The dispersion was cooled to room temperature and found to have a Brookfield viscosity of 775 centipoises at 20 rpm, spindle No. 2, a pH of 7.95 and a solids content of 34.5 percent. The dispersed phase had a particle size of 0.6 micron as determined by light scattering techniques. In the neutralization step, enough neutralizer was present for about a 60 percent total neutralization and the equivalent ratio of chain extender to prepolymer ($NH_2$/NCO) was 0.95.

A sample of the dispersion was coated onto steel panels by drawing down with a 3-mil drawbar. The coating was allowed to dry for 24 hours at room temperature and the coated panels were then soaked in water for 24 hours at room temperature. After this time, the panels were removed from the water, cross-hatched with a knife edge, and the coating adhesion to the substrate tested by applying masking tape over the coated cross-hatched area and pulling sharply at 90° to the surface. Applying this test, no coating was lost.

The comparative polyurethane product was prepared from the following charge:

| Ingredient | Parts by Weight |
|---|---|
| PCP 0231X[1] | 561.2 |
| dimethylolpropionic acid | 75.4 |
| neopentyl glycol | 37.4 |
| dibutyltin dilaurate | 0.6 |
| N-methyl-2-pyrrolidone (0.05 percent by weight water) | 345.2 |
| deionized water | 0.06 |
| HYLENE W | 15.3 |

[1]PCP 0231X is a polycaprolactone diol commercially available from Union Carbide Corporation having a molecular weight of about 1250 and believed to be formed from ring opening epsilon-caprolactone with neopentyl glycol.

The above ingredients (NCO/OH equivalent ratio = 1.38) were charged to a reaction vessel, heated under a nitrogen atmosphere at about 95° C. for about 2½ hours. The resulting prepolymer had an NCO equivalent of about 1434.

Four hundred (400) parts by weight of the prepolymer were preheated to 70° C. and charged to a mixture preheated to about 73° C. of 7.8 parts by weight of dimethylethanolamine, 480 parts by weight of deionized water and 6.5 parts by weight of hydrazine hydrate solution (64 percent by weight minimum) chain extender. A milky white dispersion having a Brookfield viscosity of 50 centipoises at 20 rpm, pH of 7.09 and a solids content of about 36 percent by weight was achieved. The dispersed phase had a particle size of 1.6 microns as determined by light scattering techniques, and the dispersion settled out upon standing. As with the preceding polyurethane, sufficient neutralizer was used for about 60 percent total neutralization and the equivalent ratio of chain extender to prepolymer ($NH_2$/NCO) was 0.95.

Using the procedure described immediately above for determining adhesion, the comparative polyurethane dispersion was coated onto a steel panel by drawing down with a 3-mil drawbar. The coating was permitted to dry for 24 hours at room temperature and the coated panels were then soaked in water for 24 hours at room temperature. The panels were removed from the water, cross-hatched and tested for adhesion as described above. Upon pulling the masking tape sharply at 90°, total delamination of the coating resulted.

In order to get a higher viscosity and more stable dispersion, more ionic groups were incorporated into the polymer by neutralizing more of the acid groups. Thus, 400 parts by weight of the comparative poly(lactone-urethane) was neutralized, chain extended and dispersed as described immediately above with the exception that it was neutralized to 100 percent total theoretical neutralization instead of 60 percent.

A dispersion having a Brookfield viscosity of 200 centipoises at 20 rpm and a ph of 8.40 was obtained. The dispersed phase had a particle size of less than one micron an did not settle out upon standing.

EXAMPLE II

A water-soluble polylactone diol formed from ring opening epsilon-caprolactone with dimethylolpropionic acid was prepared from the following charge:

| Ingredient | Parts by Weight |
|---|---|
| dimethylolpropionic acid | 570 |
| epsilon-caprolactone | 2120 |

The dimethylolpropionic acid and epsilon-caprolactone were charged to a reaction kettle at a 1/5 molar ratio and heated under a nitrogen atmosphere with stirring for 4.5 hours at 125°-150° C. to produce a product which had an acid value of 87.7 and a hydroxyl value of 78.6, and contained 91.8 percent total solids.

The above resin (14.4 parts by weight) and mixed with 2 parts by weight of N,N-dimethylethanolamine and dissolved in 16.4 parts by weight of deionized water. An additional 32.8 parts by weight of water was added, resulting in a stable dispersion having a total solids content of 25 percent.

EXAMPLE III

A water-soluble polyacetone diol similar to that of Example II was prepared with the exception that the molar ratio of dimethylolpropionic acid to epsilon-caprolactone was 1/20. The reaction charge was as follows:

| Ingredient | Parts by Weight |
|---|---|
| epsilon-caprolactone | 10,000 |
| dimethylolpropionic acid | 588 |

The epsilon-caprolactone and dimethylolpropionic acid were charged to a reaction vessel and heated under a nitrogen atmosphere with stirring for 6 hours at 115°-130° C. The resultant product had an acid value of 25.1 and an OH value of 47.4, and contained 97.7 percent total solids.

The above resin (25.1 parts by weight) was heated to 50° C. and mixed with one part by weight of N,N-dimethylethanolamine and dissolved in 26.1 parts by weight of water. Further addition of 52.2 parts by weight of water resulted in a stable dispersion.

EXAMPLE IV

A water-soluble polylactone diol similar to Examples II and III was prepared with the exception that the molar ratio of dimethylolpropionic acid to epsilon-caprolactone was 1/10. The reaction charge was as follows:

| Ingredient | Parts by Weight |
|---|---|
| dimethylolpropionic acid | 1,894 |
| epsilon-caprolactone | 16,140 |

The dimethylolpropionic acid and epsilon-caprolactone were charged to a reaction kettle and reacted under a nitrogen atmosphere with stirring at 130°-140° C. for 3.5 hours. The resultant product had an acid value of 44.1, hydroxyl value of 87.4 and contained 96.6 percent total solids. The acid equivalent weight of the product was 1272 and the hyroxyl equivalent weight was 642.

The above resin (14 parts by weight) was heated to 50° C. and mixed with 1.0 part by weight of N,N-dimethylethanolamine and dissolved in 15 parts by weight of water to form a stable dispersion. Upon standing at room temperature, the dispersion solidified as a result of the crystallinity of the polycaprolactone. However, heating the mixture at 40° C. remelted the polylactone and no settling was observed indicating the dispersion had not been destroyed. The same phenomena was observed when the mixture was reduced to 25 percent solids by the addition of more water.

EXAMPLE V

A water-soluble poly(lactone-urethane) diol was prepared by reacting the polylactone diol of Example IV with a drying oil and 4,4'-methylene-bis(cyclohexyl isocyanate), HYLENE W, in the presence of dibutyltin dilaurate catalyst and N-methylpyrrolidone solvent in the following charge ratio:

| Ingredient | Parts by Weight |
|---|---|
| polylactone diol of Example IV | 640 |
| drying oil[1] | 141 |
| HYLENE W | 381.2 |
| dibutyltin dilaurate | 0.58 |
| N-methylpyrrolidone | 387.5 |

[1]The drying oil was prepared by esterifying pentaerythritol with a fatty acid mixture of 17 percent by weight oleic acid, 42 percent by weight linoleic acid and 40 percent by weight conjugated linoleic acid, commercially available from Hercules Inc. as PAMOLYN 300, in a charge ratio of 717 parts by weight of pentaerythritol to 2695 parts by weight of PAMOLYN 300. The drying oil had an acid value of 8.1 and a hydroxyl value of 163.2 and a percent total solids of 97.2.

All the ingredients were charged to a reaction vessel and reacted at 90° C. for 3 hours to form an NCO prepolymer which was then dispersed and chain extended by charging to a mixture of 26.7 parts of N,N-dimethylethanolamine neutralizer (60 percent total neutralization), 37.5 parts of hydrazine hydrate solution (64 percent by weight minimum) chain extender and 1850 parts deionized water so as to simultaneously disperse and chain extend the preopolymer product. The resulting product is a very fine stable dispersion having a Brookfield viscosity of 1220 cps. (at 1000 rpm) and a solids content of 32 percent at a pH of 8.00.

EXAMPLE VI

A water-soluble poly(lactone-urethane) was prepared by reacting the polylactone diol of Example IV with neopentyl glycol and HYLENE W in this presence of dibutyltin dilaurate catalyst and N-methylpyrrolidone solvent to form a prepolymer. The prepolymer was then reacted with an amine to form salt groups followed by dispersing the salt group-containing prepolymer in water and chain extending with hydrazine.

The charge for making the prepolymer was as follows:

| Ingredient | Parts by Weight |
|---|---|
| polylactone diol of Example IV | 1280 |
| neopentyl glycol | 104 |
| HYLENE W | 655 |
| dibutyltin dilaurate | 1.02 |
| N-methylpyrrolidone | 875 |

The prepolymer was prepared by charging the ingredients to a reaction vessel and heating for 4 hours at 80°-85° C. under a nitrogen atmosphere. The prepolymer had an NCO equivalent of 2400 (theory 2915) and a total solids of 70 percent.

The prepolymer was neutralized by adding 85.5 parts by weight of triethylene diamine (80 percent total neutralization) to 2915 parts by weight of the prepolymer preheated to 60° C. The neutralized prepolymer was then dispersed by adding 5425 parts by weight of deionized water. Chain extension was accomplished by adding 29.4 parts by weight of hydrazine hydrate solution (64 percent by weight minimum) to the prepolymer dispersant to form a stable, low viscosity product having a Brookfield viscosity of 75 centipoises (at 20 rpm's) and 90 centipoises (at 100 rpm's), and a pH of 8.20.

EXAMPLE VII

A water-soluble polylactone diol prepared by ring opening epsilon-caprolactone with tartaric acid was prepared from the following charge:

| Ingredient | Parts by Weight |
|---|---|
| tartaric acid | 300 |
| epsilon-caprolactone | 2280 |

The tartaric acid and epsilon-caprolactone were charged to a reaction vessel under a nitrogen atmosphere and heated to 100° and 145° C. for 3½ hours to form a product with an acid value of 79.6, an OH value of 55.4 and a total solids content of 96.4 percent.

EXAMPLE VIII

A water-soluble polylactone diol was prepared by ring opening epsilon-caprolactone with 2,4-dihydroxybenzoic acid in the following charge ratio:

| Ingredient | Parts by Weight |
|---|---|
| 2,4-dihydroxybenzoic acid | 77.0 |
| epsilon-caprolactone | 570 |

The dihydroxybenzoic acid was mixed with the epsilon-caprolactone in a 1/10 molar ratio and charged to a reaction vessel. The reaction mixture was heated at 130° C. for 8½ hours to yield a product having a total solids content of 95.6 percent, an OH value of 70.9 and an acid vaue of 35.4.

The above crystalline reaction product was dispersed in water by first melting the polycaprolactone polymer at 50° C., neutralizing 18.9 parts by weight of the polymer with one part by weight of N,N-dimethylethanolamine and dissolving in 19.9 parts by weight of water. The dispersion tended to solidify on cooling but was stable upon heating.

EXAMPLE IX

A water-soluble polylactone diol was prepared by ring opening epsilon-caprolactone with a low molecular weight polyester having an acid equivalent weight of 460. The charge for making the polylactone diol was as follows:

| Ingredient | Parts by Weight |
|---|---|
| polyester[1] | 24.1 |
| epsilon-caprolactone | 114 |

[1]The polyester was prepared by polycondensing 4 equivalents of adipic acid, 3 equivalents of trimethylolpropane and 2 equivalents of neopentyl glycol until a product having 96.8 percent solids and a Gardner-Holdt viscosity of $Z^4$-$Z^5$ was obtained. The product had an acid value of 122 and a hydroxyl value of 241.

The low molecular weight polyester and caprolactone were combined with one another and heated to 150° C. for 10 hours to reach a total solids content of 96.3. The polylactone diol had an acid value of 23.3 and a hydroxyl value of 39.3.

A stable dispersion was made by mixing 27.1 parts by weight of the polylactone diol with one part by weight of N,N-dimethylethanolamine and adding 28.1 parts by weight of water at 50° C. If the water is at room temperature, the resin tends to crystallize upon mixing.

EXAMPLE X

A water-soluble polylactone diol was prepared from the following charge:

| Ingredient | Parts by Weight |
| --- | --- |
| pyromellitic dianhydride | 21.8 |
| 1,6-hexanediol | 23.2 |
| epsilon-caprolactone | 228 |

The above ingredients were charged to a reaction vessel and heated under a nitrogen blanket for about 5 hours at 140°–160° C. to form a product having a total solids content of 96.1 percent, an OH value of 29.8 and an acid value of 33.4.

In the above reaction, it is believed that the hexanediol reacts faster with the pyromellitic dianhydride than it would with the epsilon-caprolactone so as to first form an acid-containing polyol which then reacts with the caprolactone.

The acid equivalent weight of the polyol would theoretically be 225 and the OH equivalent weight would be 225.

The final reaction product was dispersed in a mixture of ethylene glycol monobutyl ether and water after neutralizing with N,N-dimethylethanolamine (100 percent total theoretical neutralization).

EXAMPLE XI

A water-soluble poly(lactone-urethane) was prepared by reacting the following charge:

| Ingredient | Parts by Weight |
| --- | --- |
| pyromellitic dianhydride | 21.8 |
| polyurethane polyol[1] | 51.6 |
| epsilon-caprolactone | 285 |

[1]The polyurethane polyol was prepared by reacting 3010 parts of piperazine with 7280 parts of propylene carbonate under a nitrogen blanket for about 3 hours to form a polyurethane polyol having an OH value of 377.

The poly(lactone-urethane) was prepared by charging the above ingredients to a reaction vessel and heating at 100°–160° C. for about 5½ hours to produce a poly(lactone-urethane) having an acid value of 26.4, an OH value of 12.9 and a percent total solids of 92.4.

In the above reaction, the polyurethane polyol reacts with the pyromellitic dianhydride to form an acid-containing polyurethane polyol which then reacts with the epsilon-caprolactone to form an acid-containing poly(lactone-urethane) polyol. The theoretical acid equivalent weight and hydroxyl equivalent weight of the intermediate polyurethane-pyromellitic dianhydride product would be 367 and 367.

The above reaction product was dispersed in water by neutralizing 23.9 parts by weight of the resin at 50° C. with one part by weight of N,N-dimethylethanolamine and mixing with 25 parts by weight of water.

EXAMPLE XII

A water-soluble polylactone was prepared by ring opening epsilon-caprolactone with a sulfonic acid-containing polyol believed to have the following structure:

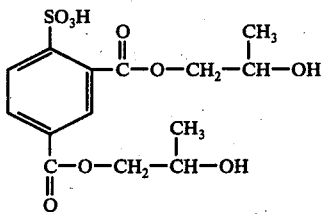

The sulfonic acid-containing polyl (acid equivalent weight at 100 percent solids was determined to be 627.5, theoretical value is 362) was dissolved as 50 percent solids in N-methylpyrrolidone which reacted with epsilon-caprolactone in the following charge ratio:

| Ingredient | Parts by Weight |
| --- | --- |
| sulfonic acid-containing polyol | 181 |
| epsilon-caprolactone | 570 |

The sulfonic acid-containing polyol and epsilon-caprolactone were reacted under a nitrogen atmosphere for 2 hours at 50°–60° C. and then 7 hours at 110°–115° C in a molar ratio of 1/20. The resultant product had an acid value of 22.5, an OH value of 45.2 and contained 87.2 percent total solids.

The above resin was dispersed in water at 50° C. by neutralizing the sulfonic acid groups with N,N-dimethylethanolamine (28 parts by weight resin/one part by weight of amine) and adding 29 parts by weight of water. The dispersion was stable but solidified overnight at room temperature. Reheating with no stirring regenerated the original translucent dispersion. Dilution with water to 25 percent total solids delayed crystallization of the resin for two days at room temperature.

We claim:

1. In a process which comprises reactting a lactone of the formula:

wherein n is an integer of from 4 to 6, and wherein at least (n+2) R's are hydrogen and wherein the remaining R's are of the group consisting of hydrogen, alkyl, cycloalkyl, alkoxy and single ring aromatic hydrocarbon radical with an active hydrogen-containing material so as to produce a polylactone having recurring

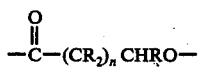

moieties in the polymer backbone, wherein the variables n and R have the aforesaid meanings, the improvement comprising:
reacting the lactone with an active hydrogen-containing material having at least 2 active hydrogen groups per molecule selected from the class consisting of hydroxyl, primary amine, secondary amine and thiol and having anionic water-solubilizing groups or groups which are readily reacted to form anionic water-solubilizing groups; said active hydrogen-containing material having an ionic equivalent weight of less than 1000, the equivalent ratio of lactone to active hydrogen-containing material being at least 0.5:1.

2. The process of claim 1 in which the lactone is epsilon-caprolactone.

3. The process of claim 1 in which the active hydrogen-containing material has the following structural formula:

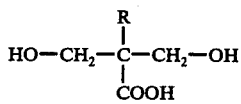

where R is hydrogen, an alkyl group containing from 1 to 12 carbon atoms or CH₂OH.

4. The process of claim 1 in which the polylactone has as ionic equivalent weight of less than 4000.

5. The polylactone prepared by the process of claim 1 in combination with at least one percent of an amine-aldehyde condensate.

6. The combination of claim 5 containing 25 to 95 percent by weight of polylactone and 5 to 75 percent by weight of amine-aldehyde condensate, the percentage by weight being based on total weight of polylactone and amine-aldehyde condensate.

7. An aqueous dispersion of the polylactone prepared by the process of claim 1 in which the polylactone constitutes from 20 to 85 percent by weight of the dispersion based on total weight of the polylactone and aqueous medium.

8. The aqueous dispersion of claim 7 which contains about 30 to 80 percent by weight polylactone based on total weight of the polylactone and aqueous medium.

9. The product prepared by the process of claim 1.

10. In an ungelled polyurethane comprising the reaction product of an organic polyisocyanate and a polylactone, the improvement comprising employing a polylactone formed from reacting a lactone of the formula:

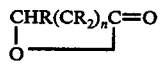

where $n$ is an integer of from 4 to 6, and where at least $(n+2)$ R's are hydrogen, and the remaining R's are of the group consisting of hydrogen, alkyl, cycloalkyl, alkoxy and single ring aromatic hydrocarbon radicals with an active hydrogen-containing material so as to produce a polylactone having recurring

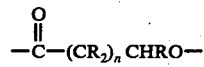

moieties in the polymer backbone, wherein the variables $n$ and R have the aforesaid meanings; said active hydrogen-containing material having at least 2 active hydrogen groups per molecule selected from the class consisting of hydroxyl, primary amine, secondary amine and thiol and having anionic water-solubilizing groups or groups which are readily reacted to form anionic water-solubilizing groups and having an ionic equivalent weight of less than 1000, the equivalent ratio of lactone to active hydrogen-containing material being at least 0.5:1.

11. The polyurethane of claim 10 in which the lactone is epsilon-caprolactone.

12. The polyurethane of claim 10 in which the active hydrogen-containing material has the following structural formula:

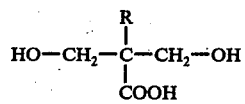

where R is hydrogen, an alkyl group containing from 1 to 12 carbon atoms or CH₂OH.

13. The polyurethane of claim 10 in which the polylactone has an ionic equivalent weight less than 4000.

14. The polyurethane of claim 10 combination with at least one percent of an amine-aldehyde condensate.

15. The combination of claim 14 containing from about 25 to 95 percent by weight of polyurethane and 5 to 75 percent by weight of amine-aldehyde condensate; the percentages by weight being based on total weight of the polyurethane and amine-aldehyde condensate.

16. An aqueous dispersion of the polyurethane of claim 10 in which the polyurethane constitutes from 20 to 85 percent by weight of the dispersion based on total weight of the polyurethane and aqueous medium.

17. The aqueous dispersion of claim 16 which contains from about 30 to 80 percent by weight polyurethane based on total weight of the polyurethane and aqueous medium.

18. A coating composition comprising the polyurethane of claim 10, in combination with pigment.

19. The coating composition of claim 18 which contains a curing agent for the polyurethane in which the curing agent is capable of reacting with the reactive hydrogens of the polyurethane to bring about chemical crosslinking after a film of the polyurethane is deposited on a substrate at room temperature or elevated temperature.

20. The coating compositon of claim 19 in which the crosslinker is an amine-aldehyde condensate.

* * * * *